SYNCHRONIZING METHOD FOR HIGH FREQUENCY SIGNAL

Filed Aug. 4, 1969 3 Sheets-Sheet 2

INVENTORS
KOZO UCHIDA

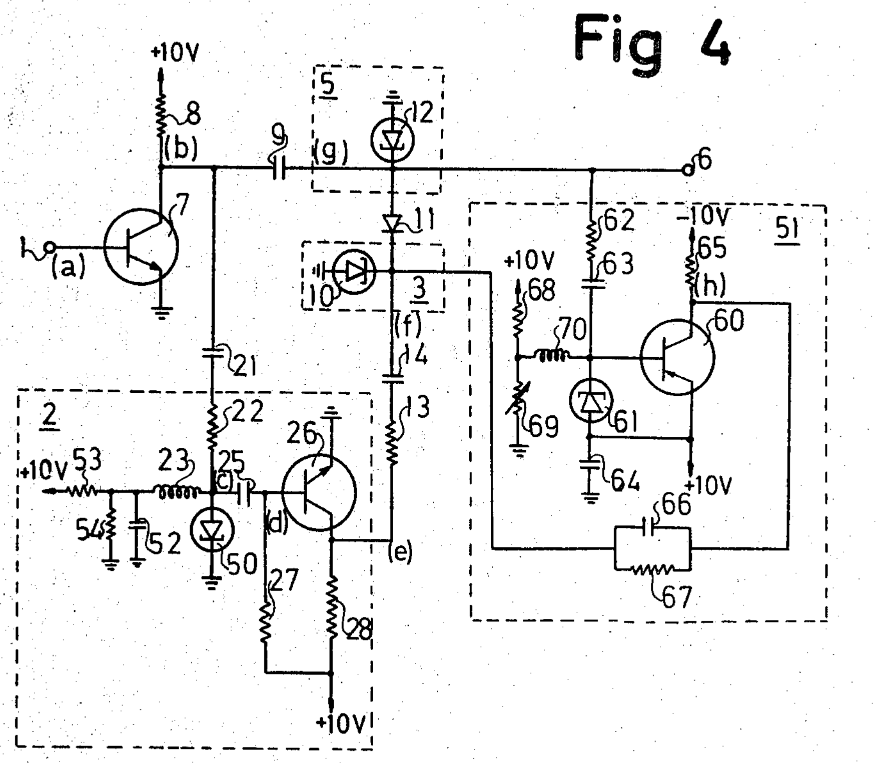
Fig 5
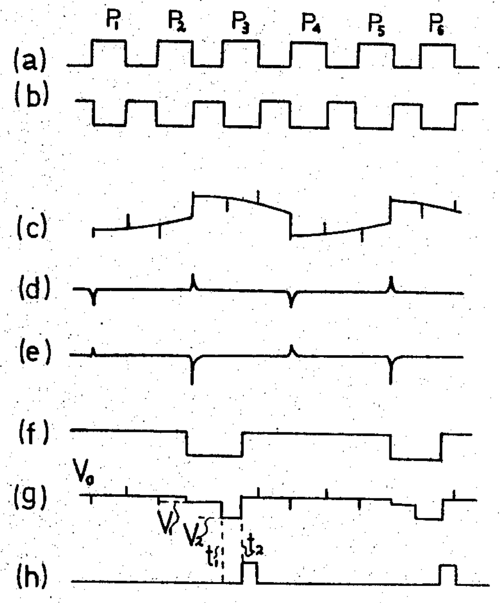

United States Patent Office 3,564,427

Patented Feb. 16, 1971

3,564,427

SYNCHRONIZING METHOD FOR HIGH FREQUENCY SIGNAL

Kozo Uchida, Tokyo, Japan, assignor to Iwatsu Electric Co., Ltd., Tokyo, Japan

Continuation-in-part of application Ser. No. 613,594, Feb. 2, 1967. This application Aug. 4, 1969, Ser. No. 847,343

Int. Cl. H03k *3/31, 25/02*

U.S. Cl. 328—63 4 Claims

ABSTRACT OF THE DISCLOSURE

An improved synchronizing circuit for obtaining an output pulse of low repetition rate, which is synchronized with an input of high frequency, in a jitterless and stable condition. The synchronizing circuit is switched from a waiting condition to an inoperative condition by the high frequency input signal and then switched back from the inoperative condition to the waiting condition which is generated a pulse by one pulse before a synchronizing pulse of the input signal.

This is a continuation-in-part of Ser. No. 613,594, filed Feb. 2, 1967, now abandoned.

The present invention relates to a synchronizing circuit for synchronizing a pulse signal having a low repetition rate with a high frequency signal, in a jitterless and stable condition.

Generally, in the synchronizing circuit of electric instruments such as an oscilloscope, the high frequency input is converted into a corresponding low repetition rate pulse.

In the conventional synchronizing method for high frequency, a pulse signal is generated when the synchronizing circuit maintained in a waiting condition receives an input signal and the waiting condition is transferred to an inoperative condition. The condition of the synchronizing circuit is again transferred from the inoperative condition to the waiting condition after a predetermined period of the inoperative condition. The period of transferring from the inoperative condition to the waiting condition is hereinafter called as the transition period.

By repeating this operation, the pulse of a low repetition rate is synchronized with an electric signal of high frequency. However, this conventional method, when the high frequency signal occurs during the transition period, the synchronizing circuit sometimes remains in an inoperative condition without returning to the waiting condition. Consequently, the pulse generated in the transition period is not stable, and exists in a jittery condition. Therefore, to obtain a synchronized pulse signal in a stable condition, the length of the inoperative time must be adjusted so as to obtain the condition in which the input signal comes to the synchronizing circuit while it is in the waiting condition.

A principal object of the invention is to eliminate the above-mentioned defect of the conventional synchronizing means, that is, to provide an improved device wherein when the synchronizing circuit is transferred from the waiting condition to the inoperative condition by the input signal and then, returned to the waiting condition by a pulse which occurs one pulse before the synchronizing pulse of the input signal.

Another object of the invention is to provide an improved synchronizing circuit for electric instruments such as an oscilloscope.

Other objects and features of the invention will become more fully apparent from the following description and the accompanying drawings and will be particularly pointed out in the claims.

Figure 2:
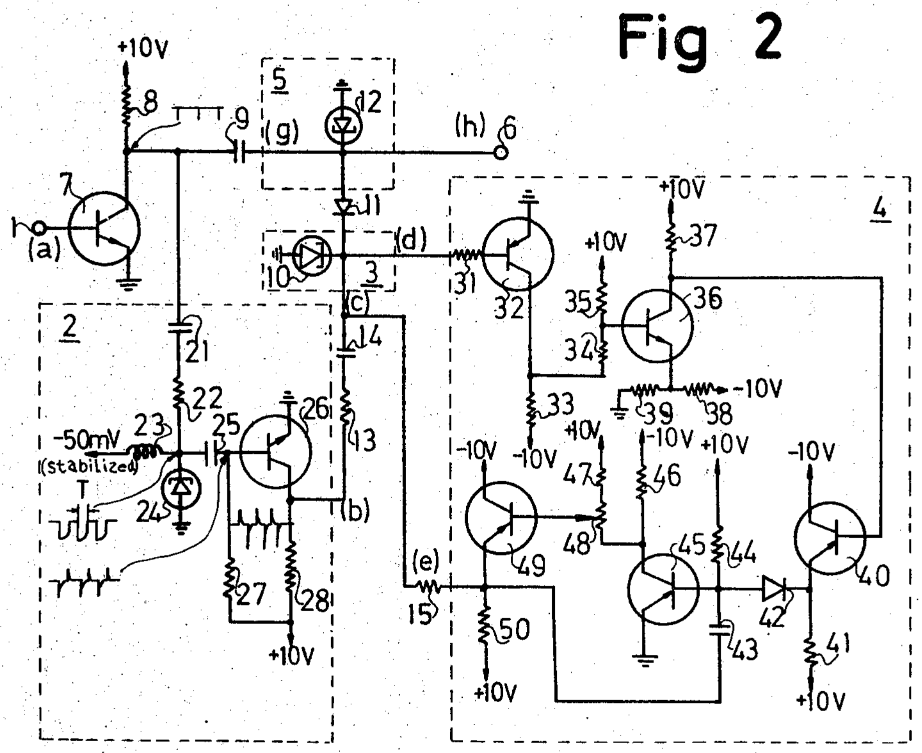
Figure 3:
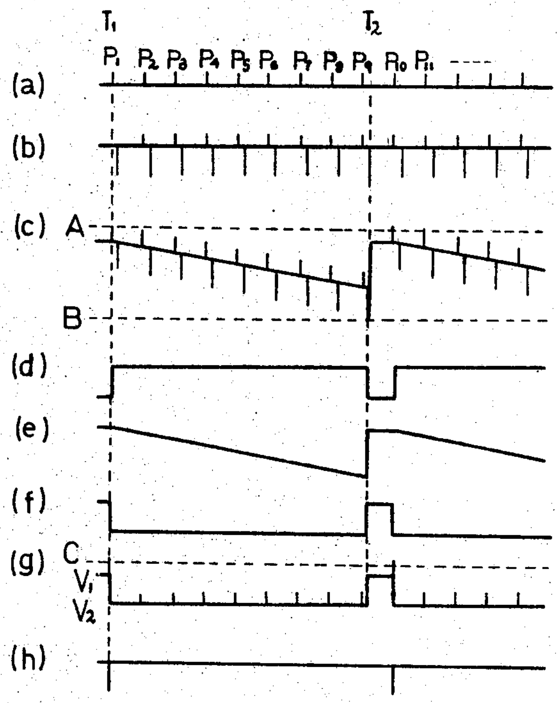
Figure 1A:
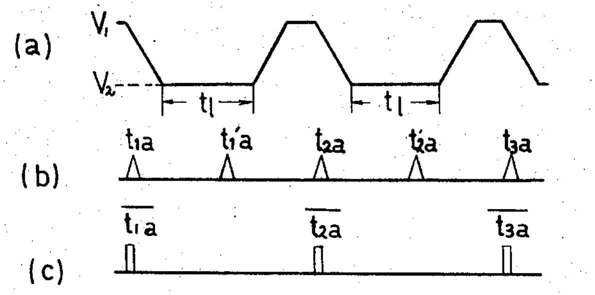
Figure 1B:
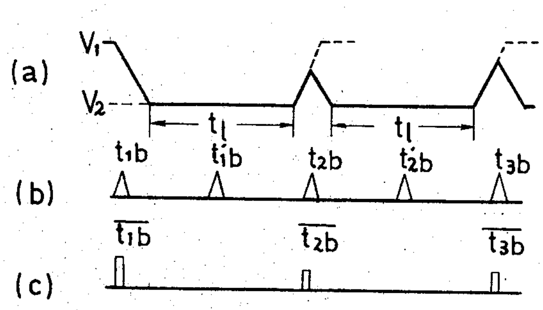

FIGS. 1A and 1B are schematic drawings of the waves showing the principal relation between the input electric signal with the output pulse according to the conventional synchronizing method, FIG. 2 is a schematic diagram of an embodiment of the synchronizing circuit of the present invention, FIG. 3 is the schematic drawing of various waveforms showing the principal relation between the input signal and the output pulse in the circuit shown in FIG. 2, FIG. 4 is a schematic diagram of another embodiment of the synchronizing circuit of the present invention, FIG. 5 is the schematic drawing of various waveforms showing the principal relation between the input signal and the output pulse in the circuit shown in FIG. 4.

The principle of the conventional synchronizing method as illustrated in FIG. 1A shows the desirable relation between the input electric signal with the output pulse according to the conventional synchronizing methods, that is, the condition wherein the synchronizing circuit is transferred from the waiting condition $V_1$, to the inoperative condition $V_2$ by the input electrical signal $t_{1a}$, and returned to the waiting condition $V_1$, after passing the predetermined period $t_1$ of the inoperative condition. The above-mentioned operation of the synchronizing circuit is repeated by the respective input electric signals $t'_{1a}$, $t_{2a}$, $t'_{2a}$, . . . FIG. 1A shows the input signals $t_{1a}$, $t'_{1a}$, $t_{2a}$, $t'_{2a}$, . . . as always occurring at the synchronizing circuit when the synchronizing circuit is maintained in the waiting condition or inoperative condition so that the output pulses of the synchronizing circuit $\overline{t_{1a}}$, $\overline{t_{2a}}$ . . . are always generated in the jitterless condition, as shown in the drawing. However, when any input signal such as $t_{2b}$, $t_{3b}$ comes to the synchronizing circuit in the transition period as shown in FIG. 1B, the output pulses $\overline{t_{2b}}$, $\overline{t_{3b}}$ are affected by the condition of the synchronizing circuit in the transition period, consequently, the output pulses are generated with a significant time and amplitude jitter.

Referring to FIG. 2, there is shown a schematic diagram of a synchronizing circuit of the present invention comprising an input terminal 1, a shaping circuit 2, a multivibrator 3, an integrator 4, a pulse generator 5 and an output terminal 6. The input terminal 1 is connected to the base of the transistor 7 whose emitter is grounded. The collector of the transistor 7 is connected through a resistor 8 to a source of positive potential, nominally shown as +10 volts, and is connected through a capacitor 21 and a resistor to a shaping circuit 2 and through a capacitor 9 to a pulse generator 5.

The shaping circuit 2 comprises a monostable multivibrator, a differentition circuit and a transistor amplifier. The monostable multivibrator includes an Esaki-diode 24 and an inductance 23. The differentiation circuit includes a capacitor 25 and an input impedance of transistor 26. The collector of the transistor 7 is connected through a capacitor 21 and a resistor 22 to a cathode of the Esaki-diode 24 whose anode is grounded. The cathode of the Esaki-diode 24 is connected through an inductance 23 to a source of negative stabilized potential, nominally shown as —50 mv., and through a capacitor 25 to a base of transistor 26 whose emitter is grounded. A junction point between capacitor 25 and a base of transistor 26 is conenectd through a resistor 27 to a source of positive potential, nominally shown as +10 volts. The collector of the transistor 26 is connected through a resistor 28 to a source of positive potential, nominally shown as +10 volts.

When electric signals $P_1$, $P_2$, $P_3$, . . . shown is (*a*) of FIG. 3 are coupled to the input terminal 1, the signals $P_1$, $P_2$, $P_3$, . . . are amplified by the transistor 7 and applied to the cathode of the Esaki-diode 24 by way of the capacitor 21 and the resistor 22. When negative pulses are applied to the cathode of the Esaki-diode 24, the monostable multivibrator including the inductance 23 and Esaki-diode 24 generates negative pulses having constant pulse width determined by the inductance 23. The output pulse of the monostable multivibrator is differentiated by the capacitor 25 and the input impedance of transistor 26 and is amplified by the transistor 26. As a result of this, these signals $P_1$, $P_2$, $P_3$ . . . are converted by the shaping circuit 2 into unsymmetrical pulse waveform of different phases as is shown in (*b*) of FIG. 3.

The multivibrator 3 is composed of the Esaki-diode 10. The colector of the transistor 26 is connected through a capacitor 14 and a resistor 13 to the cathode of Esaki-diode 10 whose anode is grounded. The output of the integrator 4 is superimposed upon the output of the shaping circuit 2 and impressed upon the multivibrator 3. The potential of the output of the integrator 4 is maintained in a predetermined condition before the operation of the multivibrator 3 as shown by a point $T_1$ in (*e*) of FIG. 3. Therefore, the output pulse of the shaping circuit 2 superimposed upon such output rises above an an operating level A of the multivibrator 3, so as to actuate the multivibrator as is shown in (*d*) of FIG. 3. That is, (*d*) of FIG. 3 is the voltage waveform of the Esaki-diode. While a part of the output of the multivibrator 3 is applied to the pulse generator 5, another part of the output of the multivibrator 3 is applied to the integrator 4 so as to be integrated.

The integrator 4 comprises a Miller circuit composed mainly of transistor 45 and 49, a timing capcitor 43 and a timing resistor 44. Cathode of the Esaki-diode 10 is connected through a resistor 31 to the base of transistor 32 whose emitter is grounded. The collector of the transistor 32 is connected through a resistor 33 to a source of negative potential, and through a voltage divider composed of resistors 34 and 35 to the base of transistor 36 whose emitter is connected to a source of negative potential by way of a voltage divider composed of resistors 38 and 39. The collector of the transistor 36 is connected through a resistor 37 to a source of positive potential, and connected to a base of the transistor 40 whose collector is connected to a source of negative potential. The emitter of transistor 40 is connected through a resistor 41 to a source of positive potential and through a diode 42 to a base of transistor 45 whose emitter is grounded. The collector of the transistor 45 is connected through a resistor 46 to a source of negative potential and through variable resistor 47 and resistor 48 to a source of positive potential. A variable point of the resistor 48 is connected to a base of transistor 49 whose collector is connected to a source of negative potential. The emitter of the transistor 49 is connected through a resistor 50 to a source of positive potential. The timing capacitor 43 is coupled between the emitter of transistor 49 and the base of transistor 45 and the timing resistor 44 is connected between the base of transistor 45 and a source of positive potential, nominally shown as +1° volts.

As mentioned above, the output potential of the integrator 4 is maintained in the predetermined condition by adjusting a variable resistor 48. When the output of multivibrator 3 is amplified by the transistors 32 and 36, and is applied through the emitter follower of transistor 40 to a Miller integrator, the output voltage of the integrator 4 is a waveform gradually decreasing as is shown in (e) of FIG. 3, the input waveform into the multivibrtor 3 is as shown in (*c*) of FIG. 3. The multivibrator 3 assumes a non-operational condition when the negative pulse of the superimposed pulse of the shaping circuit 2 super-imposed upon the output of the integrator 4 exceeds the non-operating level B of the multivibrator 3. (See point $T_2$ of (*d*) of FIG. 3.) Accordingly, the output of the integrator 4 again assumes a condition having a constant potential as shown at (*e*) of FIG. 3 and the multivibrator 3 operates again so as to repeat the aforementioned operations when the signal pulse $P_{10}$ is applied to the synchronizing circuit. Therefore, the pulses $P_2$, $P_3$, . . . , $P_9$ superimposed during the period are all cut-off.

The pulse generator 5 is composed of the Esaki-diode 12. The collector of the transistor 7 is connected through a capacitor 9 to the cathode of the Esaki-diode 12 whose anode is grounded. The cathode of the Esaki-diode 10 is connected through a diode 11 to the cathode of the Esaki-diode 12. The output of the multivibrator 3 is a supply of current having a waveform shown in (*f*) of FIG. 3 applied to the pulse generting circuit 5, that is to the Esaki-diode 12, by way of the diode 11. Currently with this, a signal applied to the input terminal 1 is amplified by the transistor 7 so as to be applied to the pulse generator 5 by way of the capacitor 9 and the waveform of the current flowing through the Esaki-diode 12 assumes a condition as shown at (*g*) of FIG. 3. As a result of this, the signal pulse $P_1$ exceeds the operating level C of the pulse generator 5, and pulse generator 5 generates a pulse synchronized with the signal pulse $P_1$. After this generation of the synchronized pulse, the superimposed pulse become lower than the operating level, the pulse generator 5 ceases its generating operation of pulses. The pulse of the signal pulse $P_9$ again causes a current flow from the Esaki-diode 12 to the multivibrator 3 as is shown with the point $T_2$ in (*f*) of FIG. 3, the pulse generator 5 starts to generate a pulse synchronized with the signal pulse $P_{10}$. When a signal pulse $P_{10}$ is superimposed upon the current flowing to the Esaki-diode 12 and a negative pulse is obtained at the output terminal 6 as is shown in (*h*) of FIG. 3. By repeating the aforementioned operations, a low frequency pulse synchronized with high frequency input signal can be obtained.

The synchronizing circuit shown in FIG. 4 is a modification of the present invention shown in FIG. 2. As shown in FIG. 4, a reset circuit 51 is used in place of an integrator 4 shown in FIG. 2. The reset circuit 51 comprises an Esaki-diode 61 provided for the monostable multivibrator and a transistor 60 proviided with a switching operation function.

Referring to FIG. 4, when electric signals $P_1$, $P_2$, $P_3$, . . . shown in (*a*) of FIG. 5 come to the input terminal 1, the signals $P_1$, $P_2$, $P_3$, . . . are amplified by the transistor 7 and applied to the anode of the Esaki-diode 50 by way of the capacitor 21 and resistor 22. When negative pulses as shown at (*b*) of FIG. 5, are applied to the anode of the Esaki-diode 50, a free running oscillator including the Esaki-diode 50 oscillating about 100 kHz. generates waveform synchronized with input signal shown in (*c*) of FIG. 5. The output waveform of the Esaki-diode 50 shown in (*c*) of FIG. 5 is differentiated by capacitor 25 and input resistance of the transistor 26 as shown in (*d*) of FIG. 5. As the transistor 26 is in a cut-off state for negative pulses and is in a conducting state for positive pulses the signals $P_1$, $P_2$, $P_3$, . . . are converted by the shaping circuit 2 into an unsymmetrical waveform as shown in (*e*) of FIG. 5. The output of the shaping circuit 2 is applied to the cathode of the Esaki-diode 10 which is in the cutoff condition, and the Esaki-diode 10 changes to the on condition as shown in (*f*) of FIG. 5. As a result of a small current flows through the diode 11, and a potential of the Esaki-diode 12, which is in a cutoff state, is converted from $V_0$ to $V_1$ as shown in (*g*) of FIG. 5. When a potential of the Esaki-diode 12 is in a state of $V_0$, the Esaki-diode 12 is in a non-operating condition for input pulses applied through the capacitor 9. When a potential of the Esaki-diode 12 is in a state of $V_1$, the Esaki-diode 12 is in a waiting condition for input pulses applied through the capacitor 9. Now, a negative input pulse is applied to the Esaki-diode 12 which is in a waiting condition, the potential $V_1$ of the Esaki-diode becomes $V_2$, that is, in an on condition. The Esaki-diode 61 is provided for the monostable multivibrator. When the potential $V_1$ of the Esaki-diode 12 changes to the on condition, namely, potential $V_2$, the Esaki-diode 61 changes to the on condition and turns the transistor 60, which is in an off condition, to an on condition as shown in (*h*) of FIG. 5. Hereupon, $t_1$–$t_2$ shown in (*g*) of FIG. 5 is a delay time, that is, the time that the negative pulse generated at time $t_1$ turns the Esaki-diode 61 to an on condition by way of the resistor 62 and capacitor 63 and continually turns the transistor 60 to an on condition. The positive pulse appearing on the collector of transistor 60 at time $t_2$ is applied through parallel connection of the resistor 67 and capacitor 66 to the Esaki-diode 10 which is in an on condition. As a result of this, the Esaki-diode 10 turns to a cutoff condition, and the Esaki-diode 12 turns to a cutoff condition, namely, inoperative condition. As shown in (*h*) of FIG. 5, the output pulse appearing on the Esaki-diode 12 becomes the pulse having a frequency below 100 kHz. By repeating the aforementioned operations, a low frequency pulse synchronized with a high frequency input signal can be obtained.

As described above, the synchronizing circuit of the invention is transferred from the waiting condition to the inoperative condition and returned to the original condition by the input signal, and pulses automatically synchronized to the input signal can be obtained without any adjustment of the synchronizing circuit. Therefore, stable and low repetition rate pulses can be obtained by the synchronizing circuit of the present invention.

While the invention has been described in conjunction with certain embodiments thereof, it is to be understood that various modifications and changes may be made without departing from the spirit and scope of the invention.

What is claimed is:

1. A synchronizing circuit for obtaining a low frequency pulse which is synchronized with a higher frequency input signal, comprising pulse generator means having said high frequency input signal coupled thereto, gating means for generating a gating pulse and for coupling the gating pulse to said pulse generator means, means for coupling said input signal to said gating means to trigger said gating means to generate said gating pulse at a time between the input signal time with which the pulse generaor pulse is to be synchronized, and an input signal time within one periodic repetition of the input signal immediately prior thereto, said pulse generator means being responsive to generate pulses only when simultaneously receiving said input signal and said gating pulse.

2. A synchronizing circuit according to claim 1, wherein said gating means comprises a shaping circuit, a multivibrator and an integrator circuit, said shaping circuit having the input signal connected thereto for converting said input signal into an unsymmetrical pulse waveform of different phases, said multivibrator being connected to said shaping circuit, and said integrator circuit being connected from said multivibrator to said shaping circuit and generating a low frequency sawtooth wave, means for superimposing said unsymmetrical pulse waveform upon said sawtooth wave, said multivibrator transferring said superimposed wave into a gating pulse, and said pulse generator being connected to said multivibrator and having said input signal connected thereto for generating a pulse synchronized with said input signal only in the presence of said gating pulse, thereby obtaining a low frequency pulse synchronized with a high frequency signal.

3. A synchronizing circuit according to claim 1 wherein said gating means comprises a shaping circuit, a multivibrator and a reset circuit, said shaping circuit having said input signal connected thereto for converting said input signal into an unsymmetrical pulse waveform, said multivibrator being connected to said shaping circuit and converting said unsymmetrical pulse waveform into a gating waveform, said pulse generator being connected to said multivibrator and having said input signal connected thereto, said reset circuit being connected from said pulse generator to said multivibrator, wherein said pulse generator generates a pulse synchronized with said input signal only when said gating pulse is present thereby obtaining a low frequency pulse synchronized with a high frequency signal.

4. A method for producing a low frequency pulse signal which is synchronized with a higher frequency input signal comprising the steps of applying the input signal to a pulse generator which is responsive to generate pulses when it receives the input signal while being gated "on," applying a gating signal to the pulse generator commencing at a time between the input signal time with which the pulse from the generator is to be synchronized, and an input signal time within one periodic repetition of the input signal immediately prior thereto.

References Cited

UNITED STATES PATENTS

| | | | |
|---|---|---|---|
| 3,099,712 | 7/1963 | Meacham | 328—63X |
| 3,111,591 | 11/1963 | Conron et al. | 307—225 |
| 3,113,221 | 12/1963 | Okuda | 307—225 |
| 3,144,581 | 8/1964 | Greenburg | 328—40X |
| 3,408,513 | 10/1968 | Cooper et al. | 307—269 |

JOHN S. HEYMAN, Primary Examiner

U.S. Cl. X.R.

307—225, 269, 286; 328—41